United States Patent
Liu et al.

(10) Patent No.: US 10,383,131 B2
(45) Date of Patent: Aug. 13, 2019

(54) TRANSMISSION METHOD FOR PHYSICAL DOWNLINK CONTROL CHANNEL, BASE STATION, AND USER EQUIPMENT

(71) Applicant: SHARP KABUSHIKI KAISHA, Sakai, Osaka (JP)

(72) Inventors: Renmao Liu, Shanghai (CN); Xingya Shen, Shanghai (CN); Qi Jiang, Shanghai (CN)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/565,240

(22) PCT Filed: Apr. 8, 2016

(86) PCT No.: PCT/CN2016/078781
§ 371 (c)(1),
(2) Date: Oct. 9, 2017

(87) PCT Pub. No.: WO2016/161958
PCT Pub. Date: Oct. 13, 2016

(65) Prior Publication Data
US 2018/0084561 A1 Mar. 22, 2018

(30) Foreign Application Priority Data
Apr. 10, 2015 (CN) .......................... 2015 1 0169442

(51) Int. Cl.
*H04L 1/00* (2006.01)
*H04W 72/08* (2009.01)
(Continued)

(52) U.S. Cl.
CPC ............ *H04W 72/085* (2013.01); *H04L 1/00* (2013.01); *H04W 4/70* (2018.02); *H04W 24/04* (2013.01);
(Continued)

(58) Field of Classification Search
CPC ..... H04W 72/085; H04W 4/70; H04W 24/04; H04W 24/08; H04W 72/042; H04L 1/00
(Continued)

(56) References Cited

U.S. PATENT DOCUMENTS

2016/0270038 A1* 9/2016 Papasakellariou .. H04W 72/042
2018/0249446 A1* 8/2018 You ........................ H04L 1/00

FOREIGN PATENT DOCUMENTS

CN          104104467 A     10/2014

OTHER PUBLICATIONS

3GPP TS 36.213 V11.5.0 (Dec. 2013) Technical Specification, 3rd Generation Partnership Project; Technical Specification Group Radio Access Network; Evolved Universal Terrestrial Radio Access (E-UTRA); Physical layer procedures (Release 11).
(Continued)

*Primary Examiner* — Sai Ming Chan
(74) *Attorney, Agent, or Firm* — ScienBiziP, P.C.

(57) ABSTRACT

The embodiments of the present invention provide a transmission and reception mechanism for a downlink control channel applicable to a narrowband MTC UE, and a base station and a user equipment for executing the mechanism. The method according to the embodiment of the present invention includes: determining an MPDCCH-PRB-set and determining a set of MPDCCH candidates in the determined MPDCCH-PRB-set according to an aggregation level, wherein a number of PRB-pairs in the MPDCCH-PRB-set is 2, 4 or 6; and monitoring the MPDCCH in the determined set of MPDCCH candidates to obtain downlink control information for an MTC UE.

4 Claims, 7 Drawing Sheets

(51) Int. Cl.
  *H04W 4/70* (2018.01)
  *H04W 24/04* (2009.01)
  *H04W 24/08* (2009.01)
  *H04W 72/04* (2009.01)
  *H04W 88/08* (2009.01)
(52) U.S. Cl.
  CPC ......... *H04W 24/08* (2013.01); *H04W 72/042* (2013.01); *H04W 88/08* (2013.01)
(58) Field of Classification Search
  USPC .................................................. 370/252
  See application file for complete search history.

(56) References Cited

OTHER PUBLICATIONS

3GPP TS 36.213 V11.3.0 (Jun. 2013) Technical Specification, 3rd Generation Partnership Project; Technical Specification Group Radio Access Network; Evolved Universal Terrestrial Radio Access (E-UTRA); Physical layer procedures (Release 11).

3GPP TS 36.211 V11.3.0 (Jun. 2013) Technical Specification, 3rd Generation Partnership Project; Technical Specification Group Radio Access Network; Evolved Universal Terrestrial Radio Access (E-UTRA); Physical Channels and Modulation (Release 11).

Ericsson, NSN Even Lower Complexity and Enhanced Coverage LTE UE for MTC, Agenda Item: 14.1.1 3GPP TSG RAN Meeting #64 RP-140990, Sophia Antipolis, France, Jun. 10-13, 2014.

ZTE , "Further considerations on physical downlink control channel for MTC enhancement", R1-150142, 3GPP TSG RAN WG1 Meeting #80, Athens, Greece, Feb. 9-13, 2015.

LG Electronics, "Downlink control channel related issues for MTC", R1-150199, 3GPP TSG RAN WG1 Meeting #80 Athens, Greece, Feb. 9-13, 2015.

* cited by examiner

| M/EPDCCH format | The number of ECCEs in one M/EPDCCH, $N_{ECCE}^{EPDCCH}$ | | | |
| --- | --- | --- | --- | --- |
| | Case A | | Case B | |
| | Centralized transmission | Distributed transmission | Centralized transmission | Distributed transmission |
| 0 | 2 | 2 | 1 | 1 |
| 1 | 4 | 4 | 2 | 2 |
| 2 | 8 | 8 | 4 | 4 |
| 3 | 16 | 16 | 8 | 8 |
| 4 | 24 | 32 | 12 | 16 |
| 5 | 12 | — | 6 | — |

FIG. 7

| MPDCCH format | The number of ECCEs in one MPDCCH, $N_{ECCE}^{MPDCCH}$ | |
| --- | --- | --- |
| | Case A Centralized transmission | Case B Centralized transmission |
| 0 | 2 | 1 |
| 1 | 4 | 2 |
| 2 | 8 | 4 |
| 3 | 12 | 6 |
| 4 | 24 | 12 |

FIG. 8

| $N_{RB}^{X_p}$ | The number of M/EPDCCH candidates in the case A $M_p^{(L_j)}$ | | | | | | | The number of M/EPDCCH candidates in the case B $M_p^{(L_j)}$ | | | | | | |
|---|---|---|---|---|---|---|---|---|---|---|---|---|---|---|
| | L=2 | L=4 | L=8 | L=12 | L=16 | L=24 | L=32 | L=1 | L=2 | L=4 | L=6 | L=8 | L=12 | L=16 |
| 2 | 4 | 2 | 1 | 0 | 0 | 0 | 0 | 4 | 2 | 1 | 0 | 0 | 0 | 0 |
| 4 | 8 | 4 | 2 | 0 | 1 | 0 | 0 | 8 | 4 | 2 | 0 | 1 | 0 | 0 |
| 6 | 6 | 4 | 3 | 2 | 0 | 1 | 0 | 6 | 4 | 3 | 2 | 0 | 1 | 0 |
| 8 | 6 | 4 | 3 | 0 | 2 | 0 | 1 | 6 | 4 | 3 | 0 | 2 | 0 | 1 |

FIG. 9

| $N_{RB}^{X_p}$ | The number of MPDCCH candidates in the case A $M_p^{(L_j)}$ | | | | | | The number of MPDCCH candidates in the case B $M_p^{(L_j)}$ | | | | | |
|---|---|---|---|---|---|---|---|---|---|---|---|---|
| | L=2 | L=4 | L=8 | L=12 | L=16 | L=24 | L=1 | L=2 | L=4 | L=6 | L=8 | L=12 |
| 2 | 4 | 2 | 1 | 0 | 0 | 0 | 4 | 2 | 1 | 0 | 0 | 0 |
| 4 | 8 | 4 | 2 | 0 | 1 | 0 | 8 | 4 | 2 | 0 | 1 | 0 |
| 6 | 6 | 4 | 3 | 2 | 0 | 1 | 6 | 4 | 3 | 2 | 0 | 1 |

TRANSMISSION METHOD FOR PHYSICAL DOWNLINK CONTROL CHANNEL, BASE STATION, AND USER EQUIPMENT

TECHNICAL FIELD

The present invention relates to the technical field of wireless communications, and more particularly to a transmission and reception method for a physical downlink control channel, a base station, and a user equipment (UE).

BACKGROUND

With the rapid growth of mobile communication and the great progress in technology, the world is becoming a completely inter-connected network society where anyone may obtain information and share data anytime and anywhere. It is estimated that by 2020, the number of inter-connected devices will reach 50 billion, of which only about 10 billion may be mobile phones and Tablet PCs and the rest are machines communicating with one another, rather with human beings. Therefore, how to design a system to support a large number of machine communication equipment is a subject in need of an in-depth study.

In the standard of Long Term Evolution (LTE) work item of the Third Generation Partnership Project (3GPP), machine-to-machine communication is called Machine Type Communication (MTC). MTC is a data communication service that does not require human participation. The large-scale deployment of MTC user equipment can be used in the fields, such as security, tracking, payment, measurement, and consumer electronics. Applications that are related to the deployment of MTC user equipment include video surveillance, supply chain tracking, smart electric meters, remote monitoring, etc. MTC requires lower power consumption and supports lower data rate and lower mobility. At present, the LTE system is mainly for human-to-human (H2H) communication services; yet, a key to achieve the large scale competitive advantage and application prospect of MTC service is that LTE networks support low-cost MTC equipment.

In addition, some MTC equipment needs to be installed in the basement of a residential building or at locations protected with an insulating foil, a metal window, or a thick wall of an existing building; as compared with conventional equipment terminals (such as mobile phones, tablet computers, etc.) in LTE networks, the air interfaces of such equipment will obviously suffer from serious penetration losses to a greater extent. The 3GPP has decided to study the solution design and performance evaluation of MTC equipment with additional 20 dB coverage enhancement. Note that MTC equipment located in poor network coverage areas has the following features: a very low data rate, a much more relaxed latency requirement, and limited mobility. The LTE network can further optimize some signaling and/or channels to better support MTC services regarding the features mentioned above.

In this respect, at the 3GPP RAN#64 convention held in June 2014, a new work item oriented on Rel-13 with even lower complexity and enhanced coverage MTC was proposed (see NPL: RP-140990 New Work Item on Even Lower Complexity and Enhanced Coverage LTE UE for MTC, Ericsson, NSN). In the description of this work item, the LTE Rel-13 system needs to support an MTC user equipment having 1.4 MHz RF bandwidth for uplink and downlink (hereinafter referred to as a narrowband MTC UE) to operate at any system bandwidth (e.g., 1.4 MHz, 3 MHz, 5 MHz, 10 MHz, 15 MHz, 20 MHz, etc.), and provides coverage enhancements for such MTC users. In the system design, low-cost MTC users and enhanced coverage MTC users adopt a unified design scheme.

For enhanced coverage MTC UEs, it is necessary to use enhancement techniques to improve the received signal strength of the physical channel of the MTC UEs. In the discussion of Rel-12 MTC, the received signal strength of MTC physical channel is mainly improved by subframe bundling or repeat transmission. The extent of coverage enhancement that MTC UEs need in different geographical locations are different; and the MTC UEs in the same cell can be put into different coverage enhancement levels. The numbers of repeat transmissions required for different coverage enhancement levels are different; the repetition level can also be used to represent the coverage enhancement level. For example, the PRACHs of the enhanced coverage MTC UEs may be divided into four repetition levels (0, 1, 2, 3), corresponding to the coverage enhancement 0 dB, 5 dB, 10 dB, and 15 dB respectively.

In the existing LTE system, an LTE UE receives a physical downlink shared channel (PDSCH) through the control information carried by a broadband physical downlink control channel (PDCCH). Alternatively, the LTE UE may receive a UE-specific enhanced physical downlink control channel (EPDCCH) through the control information carried by the broadband physical downlink control channel (PDCCH), and then may receive the PDSCH through the control information carried by the EPDCCH. Because the MTC UE in Rel-13 can only operate at a bandwidth of 1.4 MHz (corresponding to a bandwidth occupied by 6 physical resource blocks (PRBs)/physical resource block pairs (PRB-pairs)) and the broadband PDCCH uses a 20M bandwidth (corresponding to a bandwidth occupied by 100 PRBs), the MTC UE in Rel-13 can only receive narrowband PDSCHs and EPDCCHs, but not broadband PDCCHs (hereinafter, the EPDCCH for the MTC UE in Rel-13 is referred to as MPDCCH). That is to say, the MPDCCH for an MTC UE in Rel-13 needs to fall in a bandwidth occupied by six physical resource blocks (PRBS). For the EPDCCH of the existing LET UE, the number of allocable physical resource block pairs (PRB-pairs) is 2, 4, or 8; and the allocable aggregation level is 1, 2, 4, 8, 16, or 32 (i.e., supporting aggregations of 1, 2, 4, 8, 16, or 32 contiguously distributed enhanced control channel units (ECCEs), respectively); but the number of PRB-pairs being 6 and its corresponding aggregation levels are not supported. Therefore, for the MTC UE to be adapted and operate at a bandwidth with the size of 6 PRBs, a new method for an MPDCCH transmission and reception for a narrowband MTC UE is desirable.

SUMMARY

The present invention is intended to provide a transmission and reception mechanism for a downlink control channel applicable to a narrowband MTC UE, and a base station and a user equipment for executing the mechanism.

According to a first aspect of the present invention, an MTC UE is provided, including: a reception unit for monitoring MTC physical downlink control channel (MPDCCH) candidates at an aggregation level 24 to obtain downlink control information (DCI) for the MTC UE when a number of PRBs in an MPDCCH physical resource block set (MPDCCH-PRB-set) allocated by a high-layer signaling is 6, wherein the MPDCCH candidates are defined according to each aggregation level and/or each repetition level.

In some embodiments, the monitoring the MPDCCH candidates includes attempting to decode each MPDCCH candidate in the MPDCCH candidates according to a format of the monitored downlink control information (DCI).

In some embodiments, the MPDCCH includes a common search space of the MPDCCH and a UE-specific search space, and the MPDCCH-PRB-set is allocated for each of the common search space of the MPDCCH and the UE-specific search space.

In some embodiments, the MPDCCH-PRB-set is determined according to a signaling received at a base station, or is a preset default MPDCCH-PRB-set, or is determined according to a preset default number of PRB-pairs.

In some embodiments, the aggregation level is allocated for each of the common search space of the MPDCCH and the UE-specific search space.

In some embodiments, the aggregation level is determined according to the signaling received at the base station or is a preset default aggregation level.

In some embodiments, the repetition level is allocated for each of the common search space of the MPDCCH and the UE-specific search space.

In some embodiments, the repetition level is determined according to the signaling received at the base station or is a preset default repetition level.

According to a second aspect of the present invention, a base station supporting MTC is provided, including: a transmission unit for transmitting, in one MTC physical downlink control channel (MPDCCH) candidate, downlink control information (DCI) for an MTC UE at an aggregation level 24 when a number of PRBs in an MPDCCH-PRB-set allocated by a high-layer signaling is 6, wherein the MPDCCH candidate is defined according to each aggregation level and/or each repetition level.

In some embodiments, the allocation unit presets a default MPDCCH-PRB-set or presets a default number of PRB-pairs.

In some embodiments, the allocation unit presets a default aggregation level.

In some embodiments, the allocation unit sets a default number of MPDCCH candidates.

According to a third aspect of the present invention, a method performed in an MTC UE is provided, including: monitoring MTC physical downlink control channel (MPDCCH) candidates at an aggregation level 24 to obtain downlink control information (DCI) for the MTC UE when a number of PRBs in an MPDCCH-PRB-set allocated by a high-layer signaling is 6, wherein the MPDCCH candidates are defined according to each aggregation level and/or each repetition level.

According to the fourth aspect of the present invention, a method performed in a base station supporting MTC is provided, including: transmitting, in one MTC physical downlink control channel (MPDCCH) candidate, downlink control information (DCI) for an MTC UE at an aggregation level 24 when a number of PRBs in an MPDCCH-PRB-set allocated by a high-layer signaling is 6, wherein the MPDCCH candidate is defined according to each aggregation level and/or each repetition level.

In some embodiments, the method further includes: presetting a default MPDCCH-PRB-set.

In some embodiments, the method further includes: presetting a default aggregation level.

In some embodiments, the method further includes: setting a default number of MPDCCH candidates.

BRIEF DESCRIPTION OF THE DRAWINGS

The above and other features of the present invention will be more evident through the detailed description below with reference to the accompanying drawings, wherein.

In the drawings, like reference numerals refer to the same or similar elements.

DETAILED DESCRIPTION OF THE PREFERRED EMBODIMENTS

The present invention will now be described in detail with reference to the accompanying drawings and specific embodiments. Note that the present invention should not be limited to the specific embodiments described below. In addition, for the sake of simplicity and a better understanding of the present invention, detailed descriptions of well-known techniques not directly related to the present invention are omitted.

Implementations of physical resource allocation for an MPDCCH according to the present invention are described in detail below using an LTE mobile communication system and its later evolved version as exemplary application environments. Note that, however, the present invention is not limited to the following implementations and may be applicable to other wireless communication systems, such as a future 5G cellular communication system.

As described above, in this context, the MPDCCH is a physical downlink control channel that transmits downlink control information for a specific type of user equipment (e.g., an MTC UE in Rel 13). The concept of a resource allocation mechanism for the MPDCCH of the present invention can be achieved by referring to and modifying resource allocation specifications for EPDCCH in 3GPP TS 36.211 V11.3.0 (2013-06) and 3GPP TS 36.213 V11.3.0 (2013-06), which are hereby incorporated by reference. In the following, unless otherwise expressly stated, if the terms used herein have been defined in two standards, the definitions also apply to this document.

In an LTE system, orthogonal frequency division multiplexing (OFDM) is used for downlink. OFDM divides the system bandwidth into multiple subcarriers, and divides the system bandwidth into multiple OFDM symbols along the time axis. A resource element (RE) covers an OFDM symbol in a time domain and covers a subcarrier in a frequency domain. The transmission time axis for the downlink may be divided into a plurality of units of radio frames. Each radio frame has a predetermined duration and can be divided into a plurality of subframes (e.g., 10 subframes indexed from 0 to 9). Each subframe includes two time slots, each time slot including a predetermined number (e.g., seven) of OFDM symbols. Available time-frequency physical resources can be divided into physical resource blocks (PRBs), each resource block covering N subcarriers (for example, typically 12 subcarriers) of one slot. A pair of resource blocks in the same frequency domain in a subframe constitutes a resource block pair (PB-pair).

What is focused on in the following example is the LTE system that supports MTC, wherein the system bandwidth is 20M and the MTC UE operates on a 1.4 M frequency bandwidth. In the system, the system bandwidth may be divided into 100 resource blocks in the frequency domain; for example, they can be represented by index ci, where i=0, . . . 100. One PRB-pair covers 12 subcarriers in the frequency domain and covers 14 OFDM symbols in the time domain; and thus, one PRB-pair may include 168 REs.

Similar to the existing EPDCCH, the basic resource granularity of the MPDCCH are defined as enhanced control channel elements (ECCEs). Each ECCE includes multiple enhanced resource element groups (EREG). Each enhanced resource element group (EREG) includes multiple REs. EREG is used to define the mapping of an enhanced control channel to resource units (REs). In some cases, one PRB-pair may include four enhanced control channel elements (ECCE), while in other cases, one PRB-pair may include two ECCEs.

Figure 1:
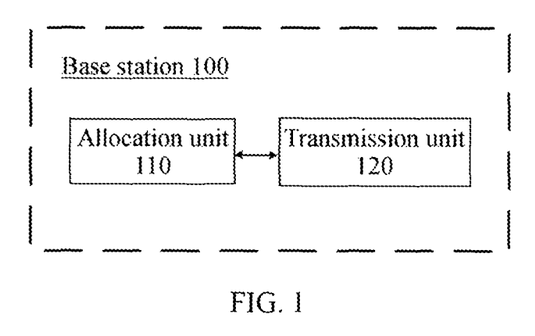
FIG. 1 is a block diagram illustrating a base station according to an embodiment of the present invention.

FIG. 1 is a block diagram illustrating a base station 100 according to an embodiment of the present invention. The base station 100 supports a wide (e.g., 20M) system bandwidth. As illustrated in the figure, the base station 100 includes an allocation unit 110 and a transmission unit 120. It will be appreciated by those skilled in the art that the base station 100 may further include other function units that are needed to implement its functions, such as various processors and memories. However, for the sake of simplicity, these well-known elements are not described in detail again herein.

The allocation unit 110 is used for allocating an MPDCCH.

As described above, the MPDCCH is a physical downlink control channel that transmits downlink control information for a narrowband MTC UE. The narrowband MTC UE refers to the UE whose operating bandwidth is much smaller than the system bandwidth, such as the machine type communication UE defined in the LTE Rel-13 system described above, and supports 1.4 MHz radio bandwidth for uplink and downlink. The MPDCCH includes scheduling information for the PDSCH of the MTC UE. The MPDCCH may be transmitted only within one subframe, or may be transmitted repeatedly within multiple subframes to enhance the coverage of the channel. MPDCCH has two search spaces: a common search space and a UE-specific search space. The common search space is used to monitor an MPDCCH where the cyclic redundancy check (CRC) is scrambled by SI-RNTI, P-RNTI, RA-RNTI, C-RNTI, SPS C-RNTI, or Temporary C-RNTI, etc. A PDSCH scheduled by the MPDCCH in the common search space mainly carries: public information such as system information, paging information, and random access response, or UE-specific allocation information and/or data and the like before a UE enters an RRC-connected state. The UE-specific search space is used to detect an MPDCCH where the cyclic redundancy check (CRC) is scrambled by C-RNTI, SPS C-RNTI or Temporary C-RNTI. A PDSCH scheduled by the MPDCCH in the UE-specific search space mainly carries UE-specific signaling and/or data.

The allocation of the MPDCCH by the allocation unit 110 includes: allocating one or more MPDCCH-PRB-sets for the MTC UE.

Preferably, the allocation unit 110 may allocate one or more MPDCCH-PRB-sets for each of the common search space and the UE-specific search space of the MPDCCH.

The MPDCCH-PRB-set is a set of physical resource block pairs (PRB-pairs) for transmitting an MPDCCH for the MTC UE. A specific type of UE (e.g., an MTC UE) monitors the MPDCCH within the set of PRB-pairs. The number of PRB-pairs in the MPDCCH-PRB-set can be allocated by RRC signaling or an MAC signaling or a physical broadcast channel or by presetting. Considering that the MTC UE in Rel 13 operates within a bandwidth with the size of six PRB-pairs, the number of PRB-pairs in the MPDCCH-PRB-set, according to the present invention, may be 2, 4 or 6. The number 2 indicates that there are two PRB-pairs in the MPDCCH-PRB-set; 4 means that there are four PRB-pairs in the MPDCCH-PRB-set, and so on. This is not the same as the design for an EPDCCH-PRB-set; and with reference to 3GPP TS 36.211V11.3.0 (2013-06) and 3GPP TS 36.213V11.3.0 (2013-06), the number of resource block pairs which may be included in the existing EPDCCH-PRB-set is 2, 4 or 8.

In the present invention, the allocation of the MPDCCH-PRB-set may be implemented and indicated in a variety of ways.

In some embodiments, all resource block pairs within the system bandwidth may be indexed (also referred to as global indexes, such as ci, where i=0, . . . 99). The MPDCCH-PRB-set can then be determined by allocating multiple cis.

Alternatively, in other embodiments, the MPDCCH-PRB-set may be allocated in two stages. The system bandwidth is divided into a plurality of frequency subbands in advance, and each frequency subband has a bandwidth with the size of six resource block pairs (i.e., each subband corresponds to a bandwidth at which the MTC UE possibly operates). For example, a 20M system bandwidth can be divided into 16 frequency subbands, which can be identified by frequency subband indexes (e.g., zj, where j=0, . . . 15). The allocation of the MPDCCH-PRB-set may then include: in the first stage, selecting a frequency subband from a plurality of frequency subbands corresponding to the system bandwidth; and in the second stage, selecting, within the selected frequency subband, a plurality of resource block pairs constituting the MPDCCH-PRB-set. The first-stage allocation may be implemented, for example, by selecting the index of a frequency subband. The second-stage allocation can be achieved in several ways. For example, the second-stage allocation may be indicated by local indexes of the PRB-pairs constituting the MPDCCH-PRB-set in the frequency subband. Correspondingly, the MPDCCH-PRB-set may be defined by a joint parameter including a frequency subband index and the local indexes of PRB-pairs. Alternatively, it is preferable that combinations of physical resource block pairs, in which the numbers of physical resource block pairs are 2, 4 and 6, can be predefined in the frequency subband; and then one of the combinations can be selected to achieve the second-stage allocation. Correspondingly, the MPDCCH-PRB-set may be defined by a joint parameter including a frequency subband index and a combination index. Alternatively, the second-stage allocation can be defined by the local index cli (e.g., li=0, . . . , 5) of a start PRB-pair in a frequency subband and the number of PRB-pairs included in the resource set (i.e., the size of the resource set). Correspondingly, the MPDCCH-PRB-set may be defined by a joint parameter including a frequency subband index, the local index of the starting PRB-pair, and the size of the resource set. In the case of the two-stage allocation, the two-stage allocation can be indicated to the UE through signaling. Alternatively, for the MTC UE, the subband allocation of the first stage may be preallocated, while only the second-stage allocation is dynamic and needs to be notified to the UE during a transmission process, which can reduce the signaling load in the system.

The allocation of the MPDCCH by the allocation unit 110 may further include: allocating the repetition level of the MPDCCH. For example, the allocation unit 110 may allocate one or more repetition levels for each of the common search space and the UE-specific search space of the MPDCCH. For example, the repetition level of the common search space of the MPDCCH is level 2 while the repetition level of the UE-specific search space of the MPDCCH is level 4. Alternatively, the allocation unit 110 may jointly allocate one or more repetition levels for the common search space and the UE-specific search space of the MPDCCH. For example, the same MPDCCH repetition level can be allocated for the common search space and the UE-specific search space through a common allocation signaling.

In the case where the repetition levels of the MPDCCH are allocated, the allocation unit 110 may allocate one or more MPDCCH-PRB-sets for each respective MPDCCH repetition level (hereinafter, a specific example of the allocation is described with reference to FIG. 3). Alternatively, the allocation unit 110 may allocate one or more PRB-pairs sets corresponding to a certain MPDCCH-PRB-set for each respective MPDCCH repetition level.

Alternatively, the allocation unit 110 may only allocate one or more PRB-pairs sets, instead of an MPDCCH-PRB-set, for each respective MPDCCH repetition level (hereinafter, a specific example of the allocation is described with reference to FIG. 4), or may fix or predefine one or more MPDCCH-PRB-sets for all MPDCCH repetition levels.

Alternatively, in the case of the previous two-stage allocation, in the first-stage allocation, a plurality of frequency subbands corresponding to the system bandwidth may be divided into multiple groups in advance; and each frequency subband group is associated with a different repetition level. Therefore, for a specific MPDCCH, the frequency subband allocated to it only can be selected from the frequency subband groups associated with its repetition levels. (Hereinafter, a specific example of the allocation is illustrated with reference to FIG. 6).

The allocation unit 110 may allocate one or more repetition levels for each of the common search space and the UE-specific search space of the MPDCCH.

Alternatively, the allocation unit 110 may jointly allocate one or more repetition levels for the common search space and the UE-specific search space of the MPDCCH.

The allocation unit 110 may allocate one or more MPDCCH-PRB-sets for each respective MPDCCH repetition level.

Alternatively, the allocation unit 110 may jointly allocate one or more MPDCCH-PRB-sets for all of the MPDCCH repetition levels. Alternatively, the allocation unit 110 may allocate one or more PRB-pairs sets corresponding to a certain MPDCCH-PRB-set for each respective MPDCCH repetition level.

Alternatively, the allocation unit 110 may jointly allocate one or more PRB-pairs sets corresponding to a certain MPDCCH-PRB-set for all of the MPDCCH repetition levels.

Alternatively, the allocation unit 110 may only allocate one or more PRB-pairs sets for each respective MPDCCH repetition level.

Alternatively, the allocation unit 110 may only allocate one or more PRB-pairs sets for each respective MPDCCH repetition level while fixing or predefining one or more MPDCCH-PRB-sets for all of the MPDCCH repetition levels.

Alternatively, the allocation unit 110 may jointly allocate one or more PRB-pairs sets, instead of an MPDCCH-PRB-set, for all of the MPDCCH repetition levels.

Alternatively, the allocation unit 110 may jointly allocate one or more PRB-pairs sets for all of the MPDCCH repetition levels while fixing or predefining one or more MPDCCH-PRB-sets for all of the MPDCCH repetition levels.

The allocation of the MPDCCH by the allocation unit 110 may further includes: allocating an aggregation level of the MPDCCH.

Similar to the existing EPDCCH, for the MPDCCH, multiple ECCEs can be aggregated together according to different aggregation levels to support the transmission of downlink control information (DCI). The aggregation level L represents the aggregation of L ECCEs to transmit downlink control information. Considering that the number of resource block pairs included in an MPDCCH-PRB-set may be six and the existing standard does not allow the EPDCCH resource set to include six resource block pairs, the aggregation levels of the MPDCCH, provided by the present invention, should include multiples of 6, such as 6, 12 and 24. In the following, the aggregation levels supported by the embodiments of the present invention are illustrated with reference to FIGS. 7 and 8.

The allocation unit 110 may allocate one or more aggregation levels for each of the common search space and the UE-specific search space of the MPDCCH.

Alternatively, the allocation unit 110 may allocate one or more aggregation levels for each respective MPDCCH repetition level of the common search space of the MPDCCH.

Alternatively, the allocation unit 110 may jointly allocate one or more aggregation levels for all MPDCCH repetition levels of the common search space of the MPDCCH.

Alternatively, the allocation unit 110 may allocate one or more aggregation levels for each respective MPDCCH repetition level of the UE-specific search space of the MPDCCH.

Alternatively, the allocation unit 110 may jointly allocate one or more aggregation levels for all MPDCCH repetition levels of the UE-specific search space of the MPDCCH.

A default aggregation level may be set for monitoring the MPDCCH.

Different default aggregation levels may be set for each of the common search space and the UE-specific search space of the MPDCCH.

Alternatively, a common default aggregation level may be set for the common search space and the UE-specific search space of the MPDCCH.

A default aggregation level may be set for each respective MPDCCH repetition level.

Alternatively, a common default aggregation level may be set for all of the MPDCCH repetition levels.

When the base station does not allocate an aggregation level for the UE, the base station transmits the control information in an MPDCCCH in a set of MPDCCH candidates according to the default aggregation level.

A default MPDCCH physical resource set may be set.

One or more default MPDCCH-PRB-sets may be set for each respective MPDCCH repetition level.

Alternatively, one or more default MPDCCH-PRB-sets may be jointly set for all of the MPDCCH repetition levels.

A default number of PRB-pairs may be set for monitoring the MPDCCH.

Different default numbers of PRB-pairs may be set for each of the common search space and the UE-specific search space of the MPDCCH.

Alternatively, a common default number of PRB-pairs may be set for the common search space and the UE-specific search space of the MPDCCH.

A default number of PRB-pairs may be set for each respective MPDCCH repetition level.

Alternatively, a common default number of PRB-pairs may be set for all of the MPDCCH repetition levels.

When the base station does not allocate the number of PRB-pairs for the UE, the base station transmits the MPDCCCH by using the default number of PRB-pairs.

The allocation unit 110 may determine a set of MPDCCH candidates in the allocated MPDCCH-PRB-set according to the aggregation level of the MPDCCH to be transmitted. The set of MPDCCH candidates is defined according to an MPDCCH search space, wherein one of the MPDCCH candidates represents an ECCE aggregate that may carry the MPDCCH in the MPDCCH search space. In the case where the aggregation level is determined, the search space for a certain aggregation level is defined by a set of MPDCCH candidates that conform to the aggregation level. In the following, the number of MPDCCH candidates in the case where the aggregation level and the size of the MPDCCH-PRB-set (i.e., the number of PRB-pairs included) are given is shown with reference to FIGS. 9 and 10.

In some embodiments of the present invention, for the MPDCCH in the common search space, only a PRB-pairs set may be allocated, and the size of the PRB-pairs set is 6 PRB-pairs. The MTC UE performs, in one PRB-pairs set, a blind detection on the MPDCCH according to the different aggregation levels. The aggregation levels of the MPDCCH in the common search space may be 1, 2, 4, 6, 12, 24, and the like. One or more PRB-pairs sets can be allocated for each respective MPDCCH repetition level. Alternatively, one or more PRB-pairs sets may be jointly allocated for all MPDCCH repetition levels.

For an MPDCCH in the UE-specific search space, it is first necessary to allocate one or more PRB-pairs sets with the size of 6 PRB-pairs for the MPDCCH in the UE-specific search space. One or more PRB-pairs sets can be allocated for each respective MPDCCH repetition level of the UE-specific search space. Alternatively, one or more PRB-pairs sets may be jointly allocated for all MPDCCH repetition levels of the UE-specific search space. Second, it is also necessary to allocate several (no more than 6) PRB-pairs in one PRB-pairs set (with the size of 6 PRB-pairs) for the MPDCCH in the UE-specific search space. It is possible to limit the alternative number of PRB-pairs in a PRB-pairs set to 2, 4, and 6.

The MPDCCH allocation completed by the allocation unit 110 may be notified to the MTC UE in a number of ways; for example, allocation information indicating the MPDCCH allocation may be transmitted by an RRC signaling or an MAC signaling or a physical broadcast channel or the like. Alternatively, the MPDCCH allocation may be preset, which is known to both the base station and the MTC UE in advance.

The transmission unit 120 may transmit the MPDCCH allocation information to the MTC user equipment.

The MPDCCH allocation information includes information indicating the allocated MPDCCH-PRB-set. Alternatively, the MPDCCH allocation information may include information indicating a repetition level and/or information indicating an aggregation level. It is to be understood that the MPDCCH allocation information may also include other time domain and/or frequency domain allocation parameters of the MPDCCH, such as the start subframe, available subframe indicator and end subframe of the MPDCCH, the size and location of the physical resource blocks, and the like.

The transmission of the MPDCCH allocation information may be carried by an RRC signaling, MAC signaling, or a physical broadcast channel.

In some embodiments, the allocation of the MPDCCH-PRB-sets is associated with repetition levels. Thus, the information indicating the MPDCCH-PRB-set allocation is also associated with the repetition levels.

Thereafter, a transmission unit 120 may transmit downlink control information for the MTC user equipment in an MPDCCH among a set of MPDCCH candidates determined by the allocation unit 110.

Figure 2:
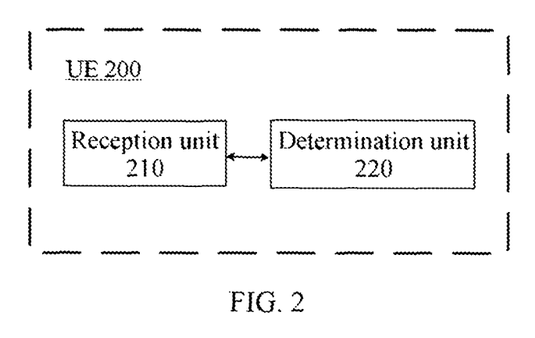
FIG. 2 is a block diagram illustrating a user equipment according to an embodiment of the present invention.

FIG. 2 is a block diagram illustrating a UE 200 according to an embodiment of the present invention. As illustrated in the figure, the UE 200 includes a reception unit 210 and a determination unit 220. It will be appreciated by those skilled in the art that the UE 200 further includes other function units that are needed to implement its functions, such as various processors and memories. However, for the sake of simplicity, detailed description is omitted herein.

The reception unit 210 is used for receiving MPDCCH allocation information from a base station. The MPDCCH allocation information may be carried by an RRC signaling, MAC signaling, or a physical broadcast channel. The MPDCCH allocation information may include information indicating an MPDCCH-PRB-set. Alternatively, the MPDCCH allocation information may include information indicating a repetition level and/or information indicating an aggregation level. It is to be understood that the MPDCCH allocation information may further include other time domain and/or frequency domain allocation parameters of the MPDCCH, such as the start subframe, available subframe indicator and end subframe of the MPDCCH, the size and location of the physical resource blocks, and the like.

In some embodiments, PRB-pairs are globally indexed within the system bandwidth. The information indicating an MPDCCH-PRB-set may include indexes of each of PRB-pairs constituting the MPDCCH-PRB-set.

In some embodiments, the system bandwidth is divided into a plurality of frequency subbands in advance. In the case where the MPDCCH-PRB-set is allocated by a two-stage allocation as described with reference to FIG. 1, the information indicating the MPDCCH-PRB-set may include information indicating a frequency subband and information indicating a distribution of multiple resource block pairs constituting the MPDCCH-PRB-set in the frequency subband. Preferably, in some embodiments, in the case where combinations of PRB-pairs in which the numbers of PRB-pairs are 2, 4 or 6 are predefined in the frequency subband, the information indicating the distribution of the plurality of resource block pairs constituting the MPDCCH-PRB-set in the frequency subband includes information indicating one of the combinations.

As stated above, in some embodiments, the allocation of the MPDCCH-PRB-sets is associated with repetition levels. Correspondingly, the information indicating the MPDCCH-PRB-set allocation is also associated with the repetition levels.

The determination unit 220 determines, according to the received MPDCCH allocation information, one or more MPDCCH-PRB-sets for monitoring the MPDCCH, the number of the PRB-pairs in each MPDCCH-PRB-set being 2, 4 or 6. Alternatively, the allocation unit 220 may further determine a set of MPDCCH candidates from the determined MPDCCH-PRB-set according to the aggregation level.

Then the reception unit 210 may monitor the MPDCCH in one or more MPDCCH-PRB-sets determined by the determination unit 220. Specifically, the reception unit 210 monitors the MPDCCH in a set of MPDCCH candidates determined by the determination unit 220 so as to obtain downlink control information for the MTC UE. Monitoring a set of MPDCCH candidates means attempting to decode each MPDCCH in the set of MPDCCH candidates according to the format of the monitored downlink control information (DCI).

For an MTC UE in Rel-13, its reception only can occur at a bandwidth of 1.4 MHz (or 6 PRB-pairs). Therefore, the MPDCCH of the MTC UE in Rel-13 needs to fall in a 6 PRB-pairs in the system bandwidth of a cell. The number of PRB-pairs of the MPDCCH may be 2, 4 or 6, instead of 2, 4, or 8 PRB-pairs in the existing EPDCCH. The aggregation levels of the MPDCCH should include multiples of 6, such as 6, 12 and 24.

Figure 3:
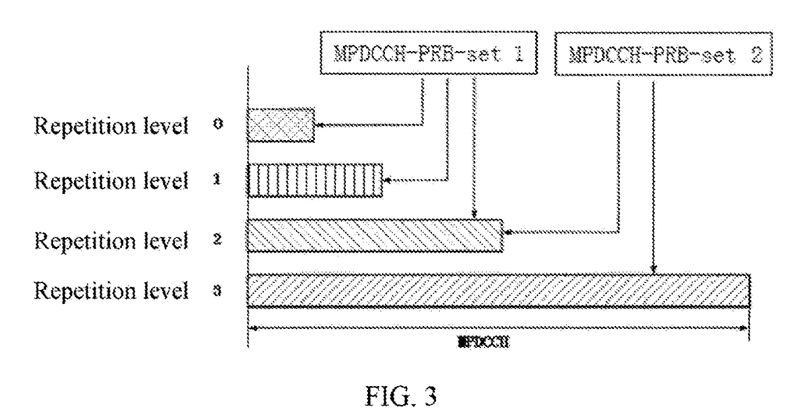
FIG. 3 is a schematic diagram illustrating an example of allocating MPDCCH physical resource block sets for each respective repetition level according to an embodiment of the present invention.

FIG. 3 is a schematic diagram illustrating an example of allocating MPDCCH-PRB-sets for each respective repetition level according to an embodiment of the present invention. As illustrated in the figure, two MPDCCH-RPB-sets are allocated: MPDCCH-PRB-set 1 and MPDCCH-PRB-set 2. Specifically, in the example of FIG. 3, MPDCCH repetition levels 0 and 1 are allocated with MPDCCH-PRB-set 1; MPDCCH repetition level 2 is allocated with two MPDCCH-PRB-sets: MPDCCH-PRB-set 1 and MPDCCH-PRB-set 2; MPDCCH repetition level 3 is allocated with MPDCCH-PRB-set 2. The allocation of the above may be performed by way of an RRC signaling, an MAC signaling, or a physical broadcast channel or by presetting.

Alternatively, one or more MPDCCH-PRB-sets may be jointly allocated for each repetition level. In this case, one or more MPDCCH-PRB-sets can be allocated for all of the MPDCCH repetition levels by one signaling.

Figure 4:
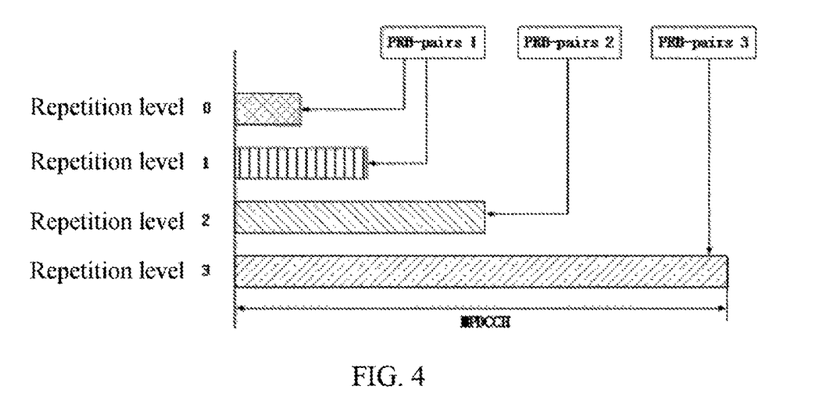
FIG. 4 is a schematic diagram illustrating an example of allocating MPDCCH physical resource block pairs for each respective repetition level according to an embodiment of the present invention.

FIG. 4 is a schematic diagram illustrating an example of allocating MPDCCH PRB-pairs sets for each respective repetition level according to an embodiment of the present invention. As illustrated in FIG. 4, three PRB-pairs sets are allocated: PRB-pairs set 1, PRB-pairs set 2, and PRB-pairs set 3. The three PRB-pairs sets may belong to the same MPDCCH-PRB-set or may belong to different MPDCCH-PRB-sets. In the example of FIG. 4, MPDCCH repetition levels 0 and 1 are allocated with PRB-pairs set 1; MPDCCH repetition level 2 is allocated with PRB-pairs set 2; MPDCCH repetition level 3 is allocated with PRB-pairs set 3. The allocation of the above may be performed by way of an RRC signaling, an MAC signaling, or a physical broadcast channel or by presetting.

Alternatively, one or more PRB-pairs sets may be jointly set for each repetition level. That is to say, one or more PRB-pairs sets are allocated for all of the MPDCCH repetition levels by one signaling.

Figure 5:
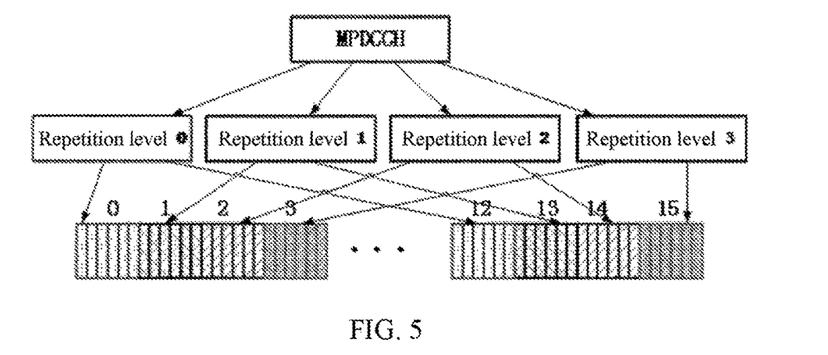
FIG. 5 is a schematic diagram illustrating dividing a system bandwidth into several frequency subbands (six PRB-pairs sets) according to an embodiment of the present invention.

FIG. 5 is a schematic diagram illustrating dividing the system bandwidth into several frequency subbands according to an embodiment of the present invention, wherein each frequency subband includes 6 PRB-pairs, also called a 6 PRB-pairs set. The reception of an MTC UE in Rel-13 only occurs at a bandwidth of 6 PRB-pairs. However, the system bandwidths that the present LTE system can support are 1.4, 3, 5, 10, 15 and 20 MHz. Thus, the system bandwidth of the cell can be divided in advance into several PRB-pairs sets with a 6 PRB-pair bandwidth. As illustrated in FIG. 5, a system bandwidth of 20 MHz is divided into 16 PRB-pairs sets, each having the size of 6 PRB-pairs. Different PRB-pairs sets can be allocated to different MPDCCH repetition levels. For example, in the figure, the PRB-pairs sets with serial numbers of 0, 4, 8, and 12 are allocated to the MPDCCH repetition level 0; the PRB-pairs sets with serial numbers of 1, 5, 9 and 13 are allocated to the MPDCCH repetition level 1; the PRB-pairs sets with serial numbers of 2, 6, 10 and 14 are allocated to the MPDCCH repetition level 2; and the PRB-pairs sets with serial numbers of 3, 7, 11 and 15 are allocated to the MPDCCH repetition level 3.

Figure 6:
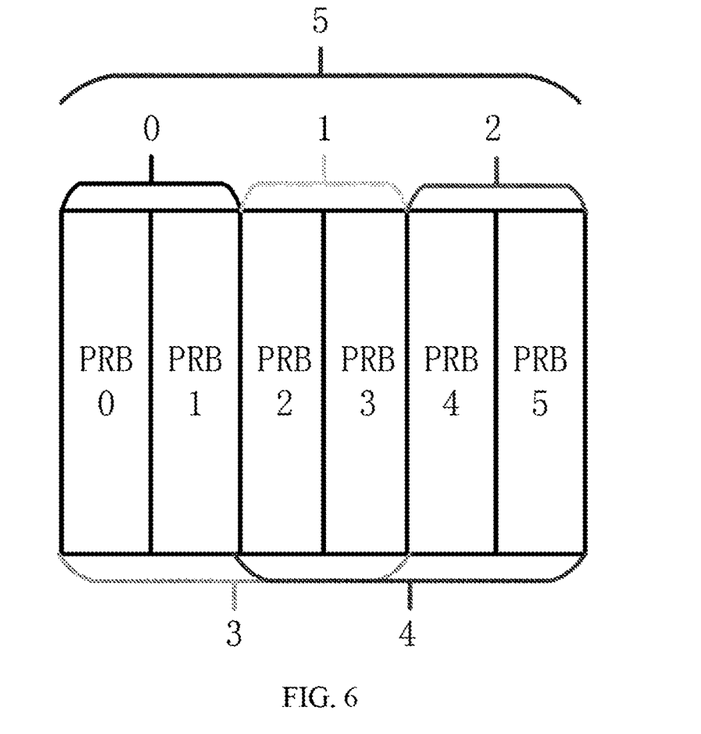
FIG. 6 is a schematic diagram illustrating an example of divided combinations including 2, 4 and 6 PRB-pairs within a frequency subband according to an embodiment of the present invention.

FIG. 6 is a schematic diagram illustrating an example of dividing PRB-pairs into combinations including 2, 4 and 6 PRB-pairs within one PRB-pairs set according to an embodiment of the present invention. PRB-pairs in FIG. 6 are contiguously distributed PRB-pairs. There are 6 combinations in total in FIG. 6: the number of the combinations having 2 PRB-pairs is 3; the number of the combinations having 4 PRB-pairs is 2; and the number of the combination having 6 PRB-pairs is 1. Any of the 6 combinations can be specifically indicated with 3 bits. One or more PRB-pairs combinations may be allocated for each respective MPDCCH repetition level of the UE-specific search space. Alternatively, one or more PRB-pairs combinations may be jointly allocated for all of the MPDCCH repetition levels of the UE-specific search space.

Figure 7:
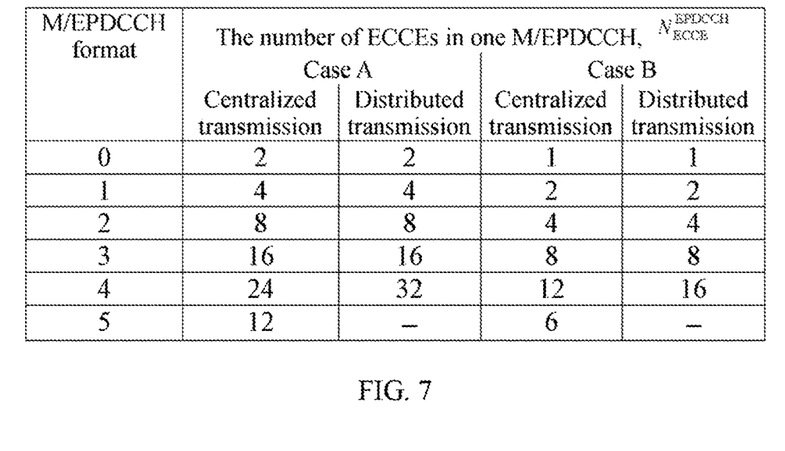
FIG. 7 illustrates M/EPDCCH formats supported in a system where both an MTC UE and an LTE UE exist according to an embodiment of the present invention.

FIG. 7 illustrates MPDCCH/EPDCCH (M/EPDCCH) formats supported in a system where both an MTC UE and an LTE UE exist according to an embodiment of the present invention. As illustrated in FIG. 7, the figure introduces a new M/EPDCCH format 5 based on Table 6.8A.1-2 of the standard 3GPP TS 36.211 V11.3.0 (2013-06) and modifies the M/EPDCCH format 4, thus introducing the transmission for an MPDCCH by aggregates (i.e., aggregation levels 6, 12 and 24) including 6, 12, and 24 ECCEs. In FIG. 7, case A represents a case where a PRB-pair includes four ECCEs, and case B represents a case where a PRB-pair includes two ECCEs. Centralized transmission means an MPDCCH/EPDCCH is transmitted in an aggregate including contiguous ECCEs. Distributed transmission means that an MPDCCH/

EPDCCH is transmitted in an aggregate including discontinuous ECCEs to obtain diversity gain.

In the case of using the M/EPDCH format illustrated in FIG. 7, for the transmission of the MPDCCH, the number of PRB-pairs included in the MPDCCH-PRB-set may be 2 or 4 (similar to the case of the EPDCCH), and may be 6. Correspondingly, aggregation levels 6, 12 and 24 (corresponding to aggregates including 6, 12 and 24 ECCEs) are supported. FIG. 7 applies to the MTC UE and the existing LTE UE.

Figure 8:
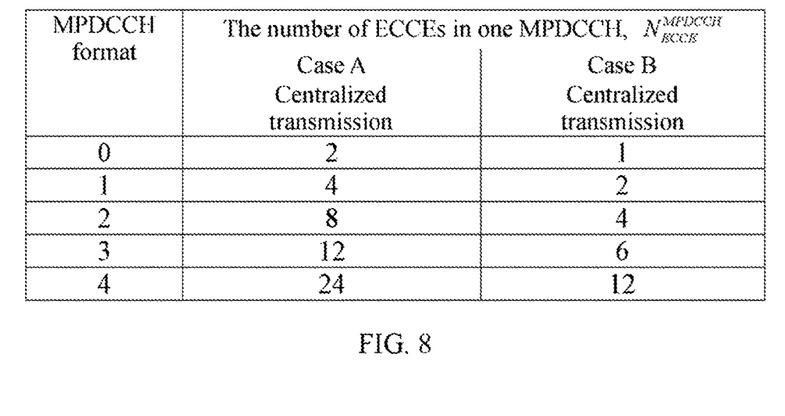
FIG. 8 illustrates M/EPDCCH formats supported in a system that only supports an MTC UE according to an embodiment of the present invention.

FIG. 8 illustrates MPDCCH formats supported in a system that only supports an MTC UE according to an embodiment of the present invention. The MPDCCH formats 0, 1, 2, 3 and 4 in FIG. 8 correspond to the M/EPDCCH formats 0, 1, 3, 5 and 4 in FIG. 7 respectively with only centralized transmission, not distributed transmission, being supported. As can be seen from FIG. 8, the possibility of using 6, 12, and 24 ECCEs for MPDCCH transmission is introduced in MPDCCH formats 3 and 4 which adapts with the working bandwidth 1.4M (corresponding to 6 PRB-pairs) of the MTC UE.

Figure 9:
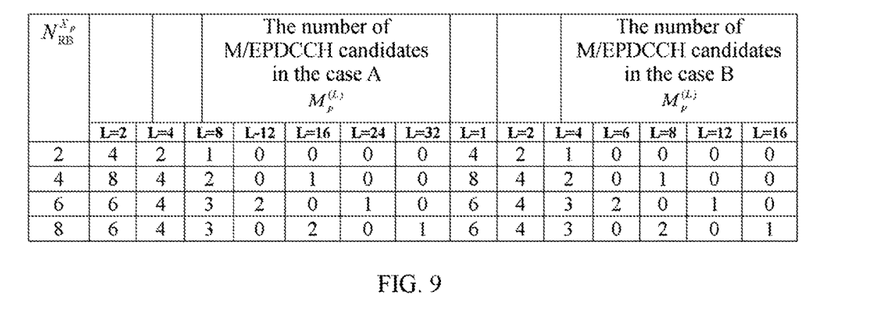
FIG. 9 is a table showing the relationships among the number of M/EPDCCH candidates that support all users, the aggregation levels, and the number of PRB-pairs according to an embodiment of the present invention.

FIG. 9 is a table showing the relationships among the number of M/EPDCCH candidates supporting all users, the aggregation level, and the number of PRB-pairs according to an embodiment of the present invention. The figure is obtained by extending Table 9.1.4-2b from the standard 3GPP TS 36.213 V11.5.0 (2013-06). In comparison with Table 9.1.4-2b, FIG. 9 is added with columns of aggregation levels L=6, 12, 24 and a row where $N_{RB}^{X_p}$ is six PRB-pairs. The corresponding number of MPDCCH candidates is shown in FIG. 9 at the specified aggregation level and $N_{RB}^{X_p}$. FIG. 9 is applicable to a system that simultaneously supports an MTC UE and an existing LTE UE. In FIG. 9, $N_{RB}^{X_p}$ represents the number of PRB-pairs for the MPDCCHL and $N_{RB}^{X_p} \in \{2,4,6,8\}$, L represents the aggregation level and $L \in \{1,2,4,8,12,16,24,32\}$. With reference to FIG. 9, the corresponding number of MPDCCH candidates can be found according to the value of the specified aggregation level and the number of PRB-pairs. The aggregation level can be allocated by an RRC signaling, an MAC signaling, or a physical broadcast channel or by presetting. The number of PRB-pairs can be allocated by an RRC signaling, an MAC signaling, or a physical broadcast channel or by presetting. After obtaining the aggregation level and the number of PRB-pairs, the MTC UE is able to find out the corresponding number of MPDCCH candidates.

Figure 10:
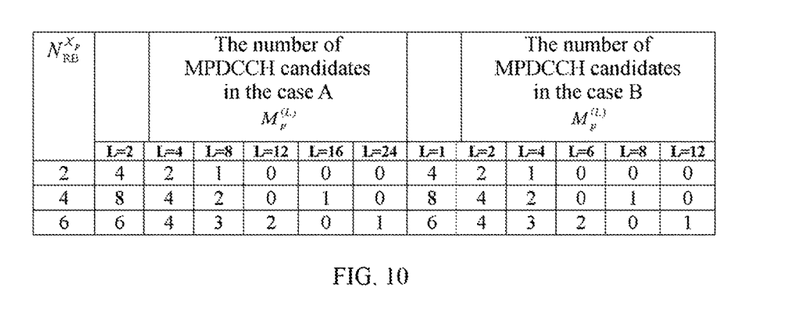
FIG. 10 is a table showing the relationships among the number of MPDCCH candidates, the aggregation levels, and the number of PRB-pairs in a system that only supports an MTC UE according to an embodiment of the present invention.

FIG. 10 is a table showing the relationships among the number of MPDCCH candidates, the aggregation level, and the number of PRB-pairs in a system only supporting an MTC UE according to an embodiment of the present invention. Similar to FIG. 9, in FIG. 10, $N_{RB}^{X_p}$ represents the number of PRB-pairs for the MPDCCH and $N_{RB}^{X_p} \in \{2,4,6,8\}$; L represents the aggregation level and $L \in \{1,2,4,8,12,16,24,32\}$. With reference to FIG. 10, the corresponding number of MPDCCH candidates can be found according to the value of the specified aggregation level and the number of PRB-pairs. The aggregation level is allocated by an RRC signaling, an MAC signaling, or a physical broadcast channel or by presetting. The number of PRB-pairs is allocated by an RRC signaling, an MAC signaling, or a physical broadcast channel or by presetting. After obtaining the aggregation level and the number of PRB-pairs, the MTC UE is able to find out the corresponding number of MPDCCH candidates.

Figure 11:
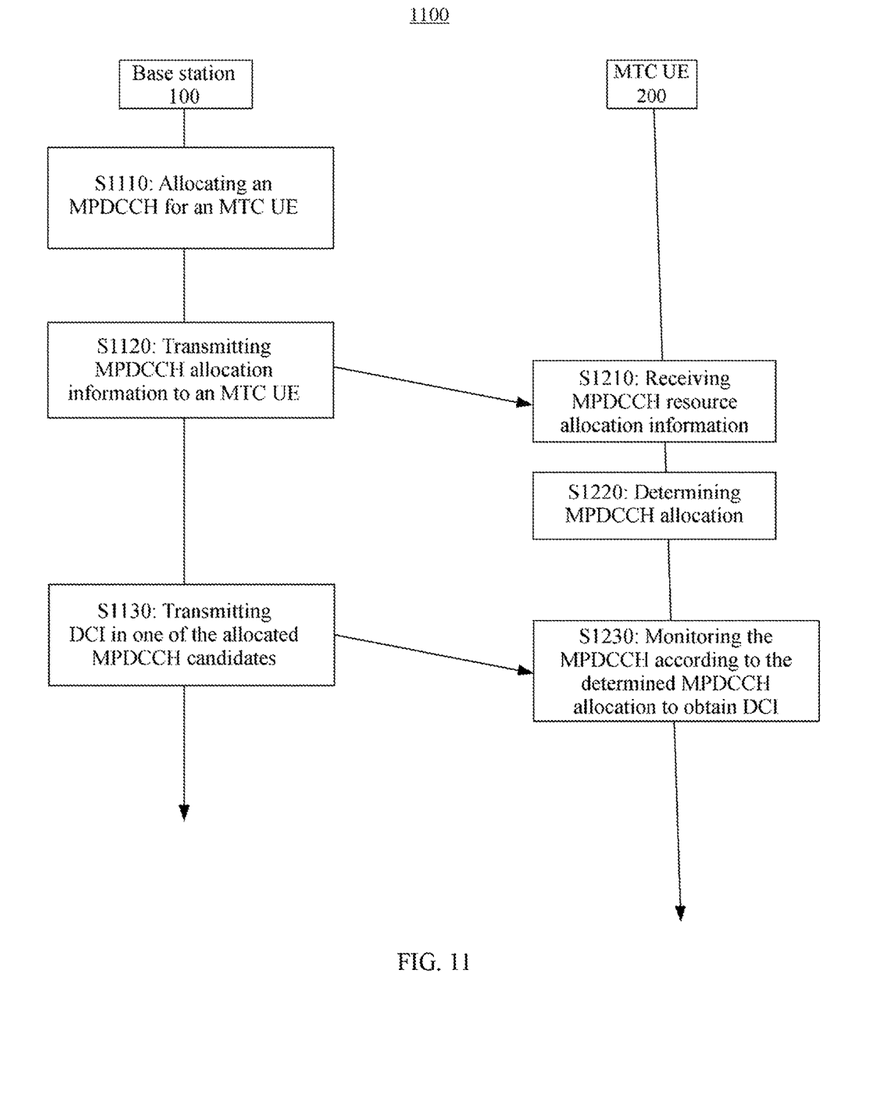
FIG. 11 is a flow diagram illustrating an example of an MPDCCH allocation and transmission method according to an embodiment of the present invention which can be implemented in a communication system that supports MTC.

FIG. 11 illustrates a flow diagram of an example of an MPDCCH allocation and transmission method according to an embodiment of the present invention which can be implemented in a communication system that supports MTC. The MTC communication system may include one or more network base stations 100 supporting MTC and one or more user equipment (MTC UEs) 200 supporting MTC. Although the figure only illustrates one base station 100 and one MTC UE 200, the present invention may include more base stations and more MTC UEs and is not limited in this aspect.

As illustrated in the figure, in step S1110, the base station 100 performs MPDCCH allocation for the MTC UE 200. Specifically, in step S1110, the base station 100 allocates one or more MPDCCH-PRB-sets for the MTC UE 200 to transmit the MPDCCH. The numbers of PRB-pairs in the MPDCCH-PRB-sets are 2, 4, or 6. Alternatively, in step S1110, the base station can further allocate MPDCCH aggregation levels and can determine a set of MPDCCH candidates in the allocated MPDCCH-PRB-sets according to the aggregation levels.

In some embodiments, the MPDCCH-PRB-set is set according to each respective MPDCCH repetition level. In other embodiments, however, the PRB-pairs in the MPDCCH-PRB-set are allocated according to each respective MPDCCH repetition level.

In some embodiments, the system bandwidth is divided into a plurality of frequency subbands in advance, each narrowband including a frequency bandwidth with the size of six resource block pairs. Thus, one or more MPDCCH-PRB-sets are allocated for the MTC user equipment in step S1110 through the following method: selecting a frequency subband from the plurality of frequency subbands and then selecting, from the selected frequency subband, a plurality of resource block pairs constituting the MPDCCH-PRB-set.

In some embodiments, the system bandwidth is divided into a plurality of frequency subbands in advance, each narrowband including a frequency bandwidth with the size of six resource block pairs. Furthermore, combinations of PRB-pairs, in which the numbers of PRB-pairs are 2, 4 or 6, are predefined in the frequency subband. Thus, one or more MPDCCH-PRB-sets are allocated for the MTC user equipment in step S1110 through the following method: selecting one of the plurality of frequency subbands and selecting one of the combinations.

In step S1120, MPDCCH allocation information is transmitted to the MTC UE, the MPDCCH allocation information including information indicating the MPDCCH PRB-set. The transmission of the MPDCCH allocation information may be carried by an RRC signaling, an MAC signaling, or a physical broadcast channel.

In some embodiments, the MPDCCH allocation information is associated with MPDCCH repetition levels.

In step S1210, an MTC UE receives the MPDCCH resource allocation information from the base station.

In step S1220, the MTC UE determines MPDCCH allocation according to the received MPDCCH allocation information. Specifically, in step S1220, the MTC UE determines, according to the received MPDCCH allocation information, one or more MPDCCH-PRB-sets for monitoring the MPDCCH, the number of the PRB-pairs in the MPDCCH-PRB-set being 2, 4, or 6. Alternatively, in step S1220, the MTC UE may further determine a set of MPDCCH candidates from the determined MPDCCH-PRB-set according to the aggregation level to reduce the number of times of blind decoding.

In step S1130, the base station transmits, in the MPDCCH-PRB-set determined in step S1110 (specifically, in one MPDCCH in one set of MPDCCH candidates determined in step S1110), downlink control information for the MTC UE.

In step S1230, the MTC UE monitors MPDCCH in the MPDCCH-PRB-set determined in step S1220 (specifically, in one set of MPDCCH candidates determined in step S1220) to obtain downlink control information for the MTC UE. Specifically, monitoring an MPDCCH in one set of MPDCCH candidates includes attempting to decode each MPDCCH candidate in the set of MPDCCH candidates according to the format of the monitored DCI.

It should be appreciated that the method 1100 may include more or fewer steps. For example, alternatively, the method 1100 may further include a step of presetting a default MPDCCH-PRB-set. Alternatively, the method 1100 may further include a step of presetting a default aggregation level. Alternatively, the method 1100 may further include a step of presetting the size of a default MPDCCH-PRB-set (i.e., the number of resource block pairs included). Alternatively, the method 1100 may further include a step of setting a default number of MPDCCH candidates.

The operations of the base station 100 and the MTC UE 200 in the MPDCCH allocation and transmission process have been described in detail above with reference to FIGS. 1 to 10 and the method 1100 will not be described in further detail herein.

The methods and related equipment according to the present invention have been described above in conjunction with preferred embodiments. It should be understood by a person skilled in the art that the methods illustrated above are only exemplary. The method of the present invention is not limited to steps or sequences illustrated above. The base station and the user equipment illustrated above may include more modules; for example, they may further include modules which can be developed or may be developed in the future to be applied to a base station or a UE, such as various processors and memories. A person skilled in the art would be taught by the illustrated embodiments to make many alterations and modifications.

It should be understood that the above embodiments of the present invention may be implemented through software, hardware, or combination of software and hardware. For example, various components inside the equipment in the above embodiments may be implemented through various devices, including but not limited to: an analog circuit device, a digital circuit device, a digital signal processing (DSP) circuit, a programmable processor, an application specific integrated circuit (ASIC), a field programmable gate array (FPGA), a complex programmable logic devices (CPLD), and the like.

In addition, the embodiments of the present invention disclosed herein may be implemented on a computer program product. More specifically, the computer program product is a product described as below. The product has a computer-readable medium on which a computer program logic is encoded. The computer program logic provides relevant operations to implement the above-described technical solution of the present invention when executed on a computing device. The computer program logic enables a processor to execute the operations (methods) described in the embodiments of the present invention when executed on at least one processor of a computing system. Such an arrangement of the present invention is typically provided as software, a code, and/or other data structures that are configured or encoded on a computer-readable medium, such as a light medium (e.g., a CD-ROM), a floppy disk or a hard disk; or, for example, firmware or other media of microcodes on one or more ROM or RAM or PROM chips; or downloadable software images, shared database and the like in one or more modules. Software or firmware or such allocation may be installed on a computing device such that one or more processors in the computing device perform the technical solutions described in the embodiments of the present invention.

Although the present invention has been illustrated in connection with the preferred embodiments of the present invention, it will be understood by those skilled in the art that various modifications, substitutions, and alterations may be made to the present invention without departing from the spirit and scope of the present invention. Accordingly, the present invention should not be defined by the above-described embodiments, but should be defined by the appended claims and their equivalents.

The invention claimed is:

1. A User Equipment (UE), comprising:
    a reception unit to monitor Machine Type Communication (MTC) Physical Downlink Control CHannel (MPDCCH) candidates at an aggregation level of 24 when a first parameter is configured by higher layers, wherein
    the first parameter indicates a MPDCCH Physical Resource Block (PRB) set with 6 PRB-pairs,
    a number of the MPDCCH candidates is defined for each aggregation level and each repetition level, and
    the repetition level is allocated for each of the common search space and the UE-specific search space of the MPDCCH.

2. An evolved NodeB (eNB), comprising:
    a transmission unit to transmit monitor Machine Type Communication (MTC) Physical Downlink Control CHannel (MPDCCH) on one of MPDCCH candidates at an aggregation level of 24 when a first parameter is configured by higher layers, wherein
    the first parameter indicates a MPDCCH Physical Resource Block (PRB) set with 6 PRB-pairs,
    a number of the MPDCCH candidates is defined for each aggregation level and each repetition level, and
    the repetition level is allocated for each of the common search space and the User Equipment (UE)-specific search space of the MPDCCH.

3. A method performed in a User Equipment (UE), comprising:
    monitoring monitor Machine Type Communication (MTC) Physical Downlink Control CHannel (MPDCCH) candidates at an aggregation level of 24 when a first parameter is configured by higher layers, wherein
    the first parameter indicates a MPDCCH Physical Resource Block (PRB) set with 6 PRB-pairs,
    a number of the MPDCCH candidates is defined for each aggregation level and each repetition level, and
    the repetition level is allocated for each of the common search space and the UE-specific search space of the MPDCCH.

4. A method performed in an evolved NodeB (eNB), comprising:
    transmitting monitor Machine Type Communication (MTC) Physical Downlink Control CHannel (MPDCCH) on one of MPDCCH candidates at an aggregation level of 24 when a first parameter is configured by higher layers, wherein
    the first parameter indicates a MPDCCH Physical Resource Block (PRB) set with 6 PRB-pairs,
    a number of the MPDCCH candidates is defined for each aggregation level and each repetition level, and the repetition level is allocated for each of the common search space and the User Equipment (UE)-specific search space of the MPDCCH.

\* \* \* \* \*